(12) United States Patent
Urano et al.

(10) Patent No.: US 6,612,157 B2
(45) Date of Patent: Sep. 2, 2003

(54) FREE FALL SENSOR WHEREIN NORMALLY CLOSED CIRCUIT IS OPENED IN RESPONSE TO FREE FALL CONDITIONS

(75) Inventors: Mitsuhiro Urano, Aichi (JP); Teruyuki Takeda, Aichi (JP)

(73) Assignee: Ubukata Industries Co., Ltd., Nagoya (JP)

( * ) Notice: Subject to any disclaimer, the term of this patent is extended or adjusted under 35 U.S.C. 154(b) by 0 days.

(21) Appl. No.: 09/756,119

(22) Filed: Jan. 9, 2001

(65) Prior Publication Data

US 2001/0007205 A1 Jul. 12, 2001

(30) Foreign Application Priority Data

Jan. 12, 2000 (JP) ......................................... 2000-004039
Sep. 14, 2000 (JP) ......................................... 2000-280176

(51) Int. Cl.[7] .............................................. G01M 1/00
(52) U.S. Cl. ..................................................... 73/65.01
(58) Field of Search ........................... 73/65.01, 514.36, 73/514.01, 514.16, 514.32, 514.38; 200/61.45 R, 61.52; 361/280; 340/699, 686, 689

(56) References Cited

U.S. PATENT DOCUMENTS

| 5,227,929 A | | 7/1993 | Comerford .................... 360/75 |
| 5,864,064 A | * | 1/1999 | Kano et al. .............. 73/514.36 |
| 5,982,573 A | | 11/1999 | Henze ......................... 360/75 |

OTHER PUBLICATIONS

Patent Abstracts of Japan, "Seismic Sensitive Switch for Earthquake Information Apparatus", JP 08–321236, Dec. 3, 1996.
Patent abstracts of Japan, "Vibration Detecting Switch", JP 08–249995, Sep. 27, 1996.

* cited by examiner

Primary Examiner—Edward Lefkowitz
Assistant Examiner—Charlene Dickens
(74) Attorney, Agent, or Firm—Foley & Lardner

(57) ABSTRACT

A free fall sensor for detecting a falling state of portable electronic equipment such as notebook personal computers includes a movable electrode including a plurality of moving portions disposed on a circumference at regular intervals so as to be equidistant from a central axis, a fixed electrode disposed outside the movable electrode so as to be brought into contact with and separated from the movable electrode, an inertial member located inside the moving portions of the movable electrode, and a buffer preventing the inertial member from contacting the fixed electrode so that the moving portions serving as movable electrodes are held between the fixed electrode and the inertial member thereby to be prevented from being pressed or rolled. The central axis makes a right angle with a direction of gravity. The inertial member normally deforms the movable electrode elastically by a weight thereof so that the moving portions are brought into contact with the fixed electrode, whereupon an electric circuit is made. Upon fall, the moving portions return the inertial member by the elasticity thereof and the moving portions are separated from the fixed electrode such that the electric circuit is opened.

10 Claims, 8 Drawing Sheets

FREE FALL SENSOR WHEREIN NORMALLY CLOSED CIRCUIT IS OPENED IN RESPONSE TO FREE FALL CONDITIONS

BACKGROUND OF THE INVENTION

1. Field of the Invention

This invention relates to a small free fall sensor detecting a fall of portable electronic equipment such as notebook type personal computers.

2. Description of the Prior Art

There is a possibility that when the above-described portable electronic equipment falls during use, recording data is seriously damaged even if a component in equipment is not almost damaged. For example, a hard disk drive used as a storage device for the above-mentioned portable electronic equipment has recently been improved in tolerance of shock of an impact. However, when recording data is written or read, a disc head supported by an arm seeks with a slight gap between it and the disc surface of a hard disc drive. Accordingly, there is a possibility that a small shock not exceeding the aforesaid mechanical tolerance may bring the distal end of the disc head into contact with the disc to thereby damage either one or both of them. As a countermeasure to prevent the damage, the head is moved to an inner radius landing zone provided around the disc before the shock acts thereon. This countermeasure can render a risk of damage minimum. However, in order that the above-mentioned countermeasure may be carried out, a process for moving the head to the inner radius landing zone is required before a stage where the disc head is subjected to a shock due to the fall. Accordingly, a sensor is required which can detect the falling equipment.

An accelerometer is one of the aforesaid sensors. The prior art has proposed various types of acceleration sensors. For example, the acceleration sensors include those of the mechanical type including a steel ball or weight. Many of the accelerometers of this type are responsive only to a transverse acceleration, whereas few of them are responsive to a gravitational acceleration. Moreover, many of the accelerometers responsive to the gravitational acceleration detect an impact acceleration in a case where a substance has fallen but very few of them can detect the falling substance before subjection to shock due to fall. For example, Japanese Patent Publication No. 8-321236A discloses a seismic switch as shown in FIG. 13. The disclosed seismic switch 101 comprises a coil spring 102 and a bob 103 supported by the coil spring 102. In the seismic switch 101, an electric circuit is made when the bob 103 is in contact with an umbrella electrode 104 disposed around the bob. However, the aforesaid seismic switch can detect only the transverse acceleration. More specifically, when the gravitational acceleration is detected by the aforesaid seismic switch, an apparent change in the weight of the bob is detected by the aforesaid seismic switch. However, in order that a decrease in the weight due to the fall may especially be detected, the coil spring needs to sufficiently change for even a slight change in the weight due to the fall as well as to support the weight of the bob. For example, the coil spring 102 needs to change its length in Japanese Patent Publication No. 8-321236A, whereupon selection of a spring constant is difficult.

Japanese Patent Publication No. 8-249995A discloses an oscillation detecting switch as shown in FIG. 14. The oscillation detecting switch 111 comprises a coil spring 112 having a distal end supporting an L-shaped support rod 113 further supporting a moving contact member 114. In response to a three-dimensional oscillation, the moving contact member 114 is brought into contact with a fixed contact member 115 so that a signal is delivered. However, when the switch having the above-described structure is used as a free fall sensor, a posture of the mounted sensor is fixed. For example, when the aforesaid switch 111 stands erect, is inverted and is inclined 90 degrees, the coil spring is compressed, extended and bent respectively. As a result, it is difficult to uniform sensor characteristic at the respective postures. On the other hand, it is desirable that the sensor detecting the falling state of the equipment should have the same characteristic when it is erect and inverted. It is further desirable that the sensor should have a sufficient freedom in the posture thereof.

A sensor such as the conventional accelerometer is adapted to be mounted on a large equipment. Such an equipment has a determined posture in the practical use. However, when used with a hard disk drive provided in a notebook personal computer, for example, the aforesaid sensor is supposed to be erect and inverted in the hard disk drive for the reason of limitation in the location of the sensor or the like. Further, when such a hard disk drive is utilized for a recent space-saving desktop personal computer, there is a possibility that the hard disk drive is used in a sideways arrangement for the reason of limitation in an accommodating space. Accordingly, the sensor, which is limited in the posture thereof, also limits the posture of equipment on which it is mounted, thereby reducing the usability thereof. Therefore, a sensor has been desired which has less limitation in the posture thereof in use.

The conventional acceleration sensors include, other than that described above, a servo acceleration sensor in which a bob is held by magnetic force and a feedback control is performed so that the bob is maintained at a constant position according to a detected acceleration. The conventional acceleration sensors further include an acceleration sensor in which warping of an optical fiber is utilized. However, each acceleration sensor consumes a large amount of electricity because of its structure and has difficulty in being rendered so small that it can be used in the portable electronic equipment.

Further, the prior art has proposed various types of small acceleration sensors using semiconductor elements. For example, a cantilever includes a bob section in a distal end thereof and a detecting section near a root thereof. The detecting section detects, as an amount of strain, a deformation of the cantilever due to a change in the acceleration. However, an impact acceleration a fallen object suffers the moment it has fallen on a floor is easily one thousand times larger that the gravitational acceleration or more. Further, when the equipment is placed on a desk in a normal use, an impact acceleration the acceleration sensor undergoes is ten times larger than the gravitational acceleration or more. On the other hand, the prior art has provided acceleration sensors with a structure that can detect a small change in the acceleration such as an apparent decrease in the weight. This type of acceleration sensor has a fragile structure for holding the bob. Accordingly, it is difficult to repeatedly use this type of acceleration sensor even after it has undergone such a large impact as described above. Of course, there is a possibility that the sensor may be damaged to thereby loose its original function when subjected to a small impact in its normal use. Further, these acceleration sensors also have the above-described problem of posture. In particular, the prior art has provided no sensors which can achieve the same characteristic when it is disposed laterally as when it is vertically, except a combination of a plurality of sensors.

SUMMARY OF THE INVENTION

Therefore, an object of the present invention is to provide a free fall sensor having a superior utility.

The present invention provides a free fall sensor comprising a movable electrode including a plurality of moving portions disposed on a circumference at regular intervals so as to be equidistant from a central axis, a fixed electrode disposed outside the movable electrode so as to be brought into contact with and separated from the movable electrode, an inertial member located inside the moving portions of the movable electrode, and a buffer preventing the inertial member from contacting the fixed electrode so that the moving portions serving as movable electrodes are held between the fixed electrode and the inertial member thereby to be prevented from being pressed or rolled. The central axis makes a right angle with a direction of gravity. The inertial member normally deforms the movable electrode elastically by a weight thereof so that the moving portions are brought into contact with the fixed electrode, whereupon an electric circuit is made. Upon fall, the moving portions return the inertial member by the elasticity thereof and the moving portions are separated from the fixed electrode such that the electric circuit is opened.

According to the above-described construction, the weight of the inertial member bends the moving portions of the movable electrode to bring them into contact with the fixed electrode when the sensor is stationary. When the sensor starts to fall, the moving portions return such that the movable electrode is separated from the fixed electrode. The conductive state between both electrodes is monitored so that the fall of the sensor and accordingly the equipment on which the sensor is mounted is detected. In this construction, the moving portions are disposed on the circumference at regular intervals so as to be equidistant from the central axis of the sensor. Accordingly, when installed so that the central axis makes a right angle with the direction of gravity, the sensor can be positioned freely about the central axis. Consequently, the sensor can easily be mounted on the equipment and the freedom in the installation attitude of the equipment on which the sensor is mounted can be increased.

The invention also provides a free fall sensor comprising a header made of a metal plate and having a centrally formed through hole in which an electrically conductive terminal pin is hermetically fixed by an electrically insulating filler so as to extend therethrough, a generally cylindrical bottomed housing made of a metal and having an open end in which the header is hermetically fixed, whereby the header and the housing constitute a hermetic housing, an electrically insulating guide disposed in the housing, an inertial member disposed in the housing and having a configuration symmetrical about a central axis of the sensor, and a movable electrode conductively fixed to a portion of the terminal pin located in the housing and including a plurality of moving portions disposed on a circumference at regular intervals so as to be equidistant from the central axis. The moving portions of the movable electrode have respective distal ends equidistant from an inner surface of the housing substantially serving as a fixed electrode in a free state of the sensor. Each moving portion has such elasticity that when disposed horizontally, each moving portion is subjected to a weight of the inertial member such that the moving portions are elastically deformed to be brought into contact with the inner surface of the housing serving as the fixed contact, thereby making an electric circuit, the moving portions being separated from the housing against the weight of the inertial member with change in an acceleration during falling. The sensor comprises a buffer provided to be positioned between the moving portions and preventing the inertial member from contacting the fixed electrode so that the moving portions serving as movable electrodes are held between the fixed electrode and the inertial member thereby to be prevented from being pressed or rolled.

In a first preferred form, the buffer is electrically insulating and is located on a portion of the inner surface of the metal housing located between the moving portions so that the moving portions serving as the movable contact are prevented from being held between the inertial member and the fixed electrode, leaving substantially no space therebetween. In this construction, a predetermined space is defined between the inertial member and the fixed electrode.

In a second preferred form, the buffer is formed by inwardly protruding a portion of a peripheral wall of the metal housing located between the moving portions so that the moving portions serving as the movable contact are prevented from being held between the inertial member and the fixed electrode, leaving substantially no space therebetween. In this construction, a predetermined space is defined between the inertial member and the fixed electrode. In this case, the sensor preferably comprises an electrical insulator provided on a bottom of the housing so that the inertial member is prevented from being conductively brought into contact with the bottom of the housing.

In a third preferred form, the sensor comprises a protrusion provided on the guide so as not to interfere with the moving portions, the protrusion preventing the inertial member from coming into contact with an interface between the movable electrode and the terminal pin and a portion of each moving portion located near a root of the moving portion, the protrusion further preventing the movable electrode from being subjected to a plastic bending deformation.

In a fourth preferred form, the sensor comprises a buffer formed by inwardly protruding a portion of a peripheral wall of the metal housing located between the moving portions so that the moving portions serving as the movable contact are prevented from being held between the inertial member and the fixed electrode, leaving substantially no space therebetween, an electrical insulator provided on a bottom of the housing so that the inertial member is prevented from being conductively brought into contact with the bottom of the housing, and a protrusion provided on the guide so as not to interfere with the moving portions, the protrusion preventing the inertial member from coming into contact with an interface between the movable electrode and the terminal pin and a portion of each moving portion located near a root of the moving portion, the protrusion further preventing the movable electrode from being subjected to a plastic bending deformation.

In a fifth preferred form, the movable electrode has a central through hole formed in a portion thereof to which the terminal pin is fixed, the sensor further comprising a metal fixing plate welded to an end face of the terminal having been inserted through the through hole and conductively holding the movable electrode between it and the terminal pin. In this construction, at least the fixing plate prevents the inertial member from directly coming into contact with an interface between the movable electrode and the terminal pin.

In a sixth preferred form, the sensor comprises a metal fixing plate conductively holding the movable electrode between itself and the terminal pin, and a recess formed in the guide at the terminal pin side so as to conform to a shape of the fixing plate. In this construction, the movable electrode is disposed between the guide and the fixing plate when the fixing plate is disposed in the recess, and the movable electrode is thrust into the recess while a portion of each moving portion near a root thereof is held between the guide and the fixing plate, whereby the movable electrode is shaped into a predetermined form. Further, the fixing plate is preferably non-circular and the recess of the guide has a protrusion conforming to the shape of the fixing plate so that the fixing plate is prevented from rotation.

BRIEF DESCRIPTION OF THE DRAWINGS

Other objects, features and advantages of the present invention will become clear upon understanding of the following description of preferred embodiments, made with reference to the accompanying drawings, in which.

DETAILED DESCRIPTION OF PREFERRED EMBODIMENTS

Figure 1:
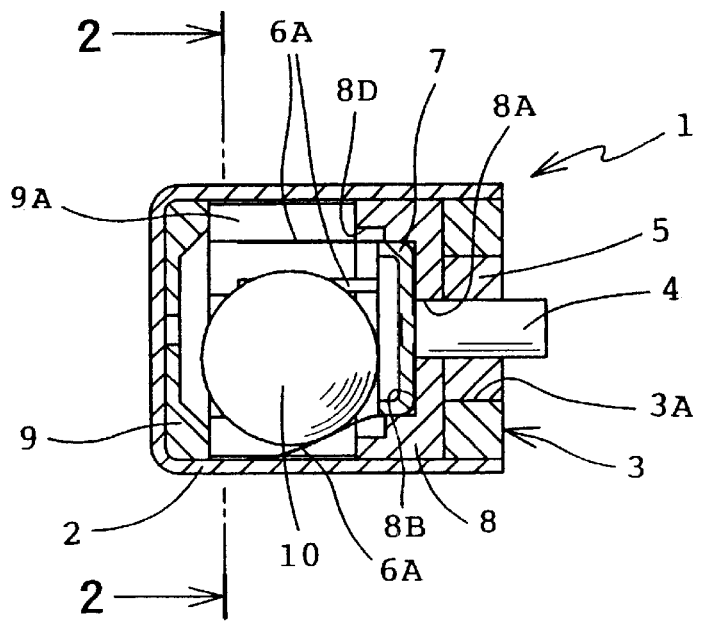
FIG. 1 is a longitudinal section of the free fall sensor of a first embodiment in accordance with the present invention.
Figures 2A, 2B:
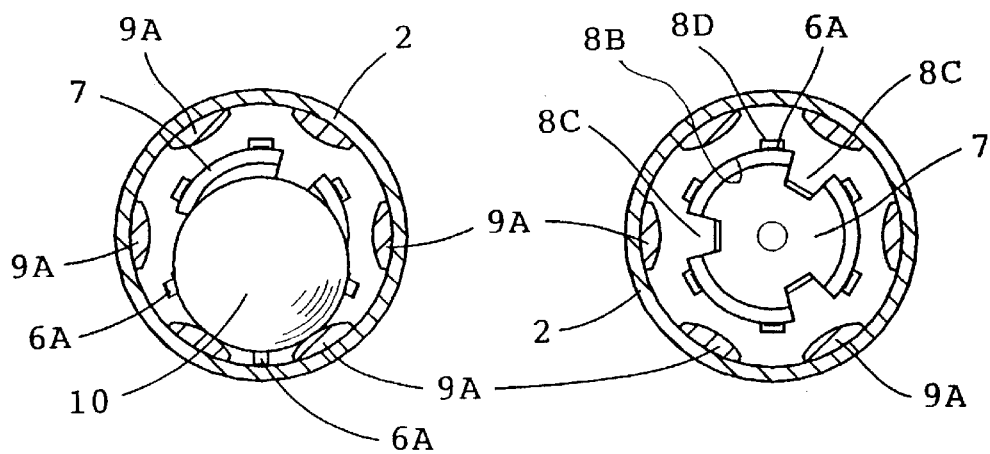
FIG. 2A is a sectional view taken along line 2—2 in FIG. 1
FIG. 2B is also a similar sectional view with an inertia ball being eliminated.
Figure 3:
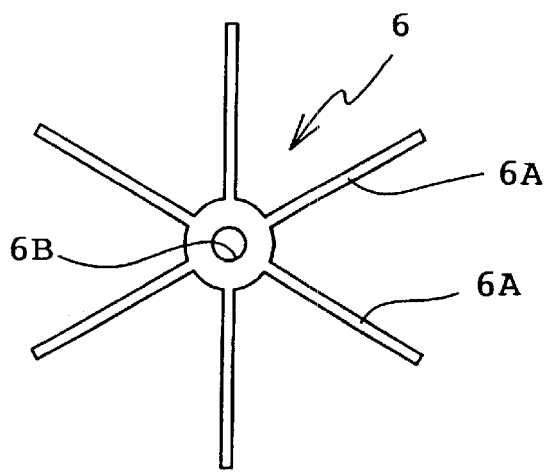
FIG. 3 is a plan view of an unshaped movable electrode.

A first embodiment of the present invention will be described with reference to FIGS. 1 to 7. Referring to FIG. 1, reference symbol 1 designates a free fall sensor of the first embodiment. The shown sensor 1 comprises a housing 2 made by drawing a suitable metal plate. The housing 2 is formed into a hollow cylindrical shape and has an open end and a closed end, that is, is bottomed. A metal header 3 is fitted in the open end of the housing 2. The header 3 is annular and has an outer diameter substantially equal to an inner circumference of the housing 2. The header 3 has a centrally formed through hole 3A in which an electrically conductive terminal pin 4 is airtightly fixed by an electrically resisting filler 5 such as glass so as to extend therethrough. The header 3 is hermetically secured to the housing 2 by welding. The housing 2 is thus constructed into a hermetic housing. Laser welding is a suitable welding manner.

An interior of the hermetic housing 2 is desirably filled with an inert gas such as nitrogen, argon or helium by substitution. The housing 2 encloses a movable electrode 6 serving as an electrical contact and an inertia ball 10 serving as an inertial member both of which will be described in detail later. An inner face of the housing 2 serves as a fixed contact as will be described in detail later. The filling of the inert gas prevents the movable electrode 6, the inner face of the housing 2 and the inertia ball 10 from corrosion, thereby preventing failure in the electrical contact state of the movable electrode 6 or movement of the inertia ball 10. The housing 2 may be filled with ordinary air when these components are electroplated for surface treatment or when these components are made of corrosion resistant materials. Further, a space in which the free fall sensor is installed may be filled with an inert gas. Thus, if there is no problem in practical use, the sensor need not be hermetically sealed. The header may be fixed to the housing by caulking or bonding.

The movable electrode 6 is conductively fixed to an end face of the terminal pin 4 located in the housing 2. The movable electrode 6 is made of a material having elasticity, for example, phosphor bronze. The movable electrode 6 includes a disk and a plurality of generally arm-shaped contact portions 6A radially extending from an outer circumference of the disk. The contact portions 6A serve as substantial moving portions respectively. The movable electrode 6 has a central through hole 6B. In the embodiment, the terminal pin 4 is inserted through the hole 6B so as to extend therethrough, and the end face of the terminal pin 4 is welded to a projection formed on a central portion of a metal fixing plate 7 so that the movable electrode 6 is held between the fixing plate 7 and the terminal pin 4 thereby to be fixed.

A guide 8 and an insulator 9 each of which is made of an electrically insulating material are disposed in the housing 2 so as to be located at the open end side and the closed end side respectively. The guide 8 has a central hole 8A through which the terminal pin 4 is inserted. The guide 8 has a recess 8B formed at one side thereof and used to dispose the movable electrode 6 and the fixing plate 7. The recess 8B is formed with three inwardly extending protrusions 8C. The fixing plate 7 is formed into such a shape that it avoids the protrusions 8C. The recess 8B has six circumferential depressions 8D provided in order that the movement of the contact portions 6A of the movable electrode 6 may not be interrupted. The depressions 8D are formed so as to correspond to the contact portions 6A respectively.

The movable electrode 6 is placed on the guide 8 so that the contact portions 6A correspond to the depressions 8D respectively. The fixing plate 7 is then fitted into the recess 8B. As a result, each contact portion 6A is shaped into a predetermined form with its root portion being held between the recess 8B and the fixing plate 7. Further, in this state, the fixing plate 7 and the terminal pin 4 are welded together, whereupon the guide 8, fixing plate 7 and movable electrode 6 are fixed to the header 3.

In the embodiment, since the movable electrode 6 made of a thin metal plate need not be shaped previously, it can easily be manipulated. Further, since the recess 8B has the protrusions 8C and the fixing plate 7 is formed into the non-circular shape so as to avoid the protrusions, the fixing plate 7 can be prevented from rotation when inserted into the recess 8B. Consequently, an undesirable deformation of the contact portions 6A, for example, distortion or lean, can be prevented.

Figures 4A, 4B:
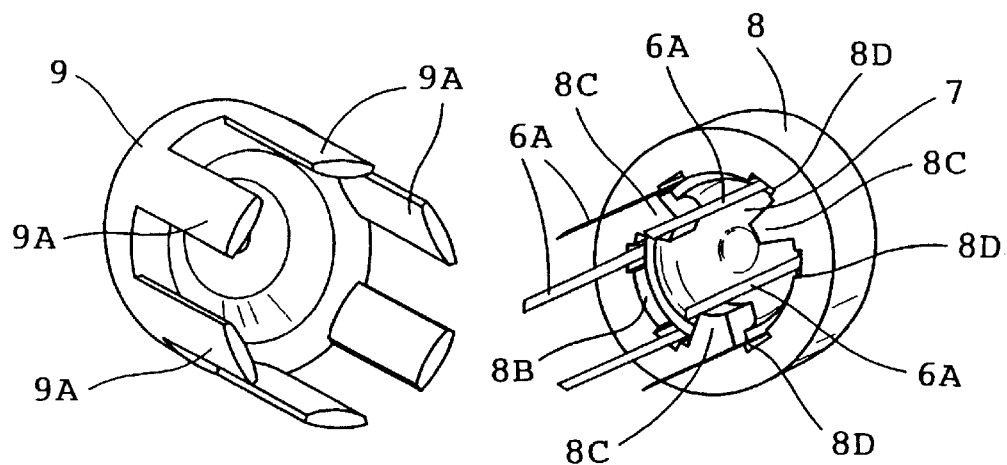
FIGS. 4A and 4B are perspective views of a guide and an insulator respectively.

The insulator 9 is disposed at the closed end side in the housing 2. The insulator 9 has a plurality of protrusions 9A formed on the outer circumference of the disk thereof as shown in FIG. 4A. Each protrusion 9A serves as a buffer preventing a direct contact between the inertia ball 10 and the housing 2 as will be described in detail later. Further, the distal end of each protrusion 9A abuts the end face of the guide 8, thereby determining an axial positional relation. A circumferential positional relation between the guide 8 and the insulator 9 is determined by putting either one of them upon the other by means of image processing in a manufacturing step. After insertion into the housing 2, the insulator 9 can be prevented from turning, for example, by outwardly spreading the distal ends of the protrusions 9A. Alternatively, the insulator 9 may be fixed to the housing 2 by an adhesive agent. Further, the contact portions of the guide 8 may have fitting portions respectively. The distal ends of the protrusions 9A may be fitted in the fitting portions respectively, whereby the positional relation between the guide 8 and the insulator 9 is fixed.

The inertia ball 10 serving as an inertial member is provided in the housing 2. When the sensor 1 stands erect and stationary as shown in FIG. 1, the inertia ball 10 normally deforms at least one of the contact portions 6A of the movable electrode 6 elastically. As a result, the distal end of the deformed contact portion 6A is brought into contact with the inner face of the housing 2 serving as the fixed electrode such that the terminal pin 4 is electrically connected with the housing 2.

The movable electrode needs to be rendered thin sufficient to be elastically deformed by the inertia ball 10 even when the free fall sensor is miniaturized. For example, when the housing 2 has a diameter of about 5 mm, the inertia ball 10 needs to have a diameter of about 3.5 mm, each contact portion 6A of the movable electrode 6 needs to have a width of about 0.3 mm and a thickness of about 15 $\mu$m.

When the inertia ball 10 is assumed to reach the inner face of the housing 2, the contact portion 6A is subjected to an impact acceleration to be stricken and rolled between the inertia ball 10 and the housing 2 rigidly when the equipment has fallen on the floor or the like. The contact portion 6A is plastically deformed, or is gradually extended or deformed after it is repeatedly held between the inertia ball 10 and the housing 2 for a long period. As a result, there is a possibility that a predetermined performance cannot be achieved from the sensor. In view of this problem, each protrusion 9A serving as the buffer provided on the insulator 9 prevents a direct contact between the inertia ball 10 and the inner face of the housing 2 serving as the fixed electrode in the embodiment such that a predetermined space is defined between the inertia ball 10 and the inner circumferential face of the housing 2. Consequently, the contact portion 6A serving as the movable contact disposed between the protrusions 9A can be prevented from being directly stricken and rolled between the inertia ball 10 and the housing 2 thereby to be prevented from plastic deformation.

Further, if the movable electrode 6 should directly be welded or otherwise secured to the terminal pin 4, the secured portion would be deformed by thermal expansion or melting such that the overall movable electrode would not be able to maintain a predetermined shape. In the embodiment, however, the movable electrode 6 is not directly welded to the terminal pin 4, but the fixing plate and the terminal pin 4 are welded together via the hole 6B of the movable electrode 6 such that the electrode is held between the fixing plate and the guide 8. As a result, the movable electrode 6 is prevented from being subjected to such heat that causes its deformation during welding, so that an undesirable deformation of the electrode can be prevented.

Further, the fixing plate 7 functions as a protecting plate for protecting the secured portion of the movable electrode 6 and its vicinity, thereby preventing the movable electrode 6 from deformation due to direct strike of the inertia ball 10 against the electrode. Additionally, when the fixing plate 7 is attached to the guide 8, the contact portion 6A of the movable electrode 6 is held between the fixing plate and the recess 8B of the guide 8, whereby the contact portion 6A can reliably be shaped into a predetermined form.

Further, the guide 8 is formed with the protrusions 8C in the embodiment. Since the inertia ball 10 is prevented from contact with the fixing plate 7 and particularly an end face 8E thereof. Consequently, the surface of the inertia ball 10 can be prevented from damage. Further, the fixing plate 7 has the slits fitted with the protrusions 8C respectively. Accordingly, the fixing plate 7 can be prevented from rotation when the fixing plate 7 is attached to the recess 8B of the guide 8. Consequently, the contact portions 6A shaped simultaneously with attachment of the fixing plate 7 can be prevented from an unexpected deformation.

The operation of the free fall sensor 1 will now be described. The sensor is mounted on electrical equipment etc. so that a central axis thereof makes a right angle with a direction of gravity. When the sensor 1 is stationary, the inertia ball 10 is subjected to gravity such that the contact portion 6A is flexed, whereupon the inertia ball is located lowest in the housing 2 as shown in FIG. 1. At this time, the inertia ball 10 is located on the protrusions 9A but does not directly hold the contact portion 6A between it and the housing 2. Moreover, the distal end of the contact portion 6A is in contact with the inner face of the housing 2 so that the terminal pin 4 is electrically connected to the housing 2.

Figure 5:
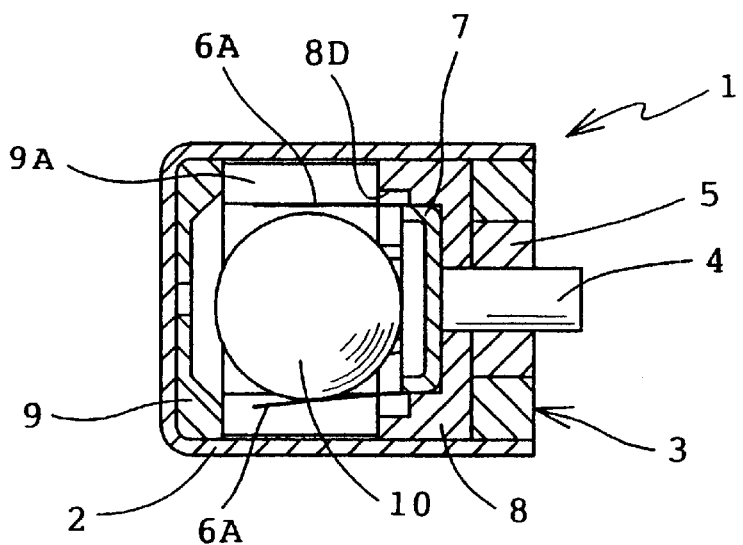
FIG. 5 is a longitudinal section of the sensor in a falling state.
Figure 6:
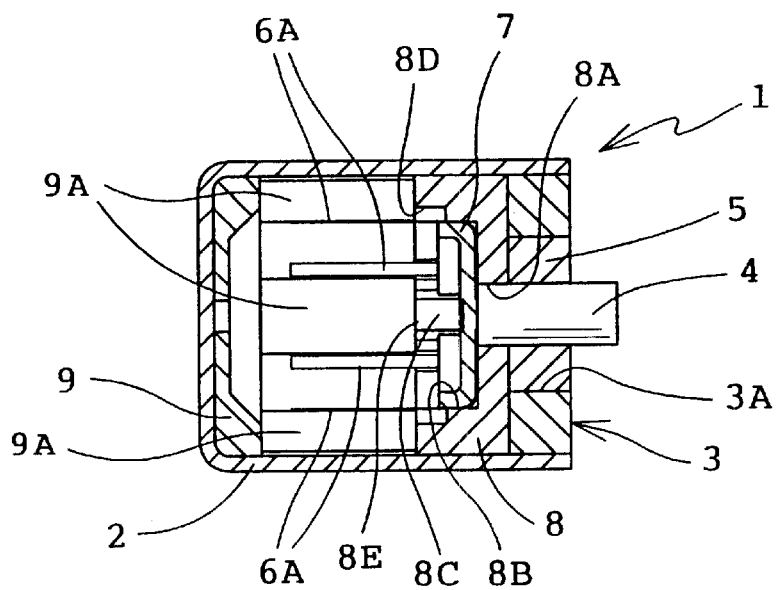
FIG. 6 is a longitudinal section of the sensor with the inertia ball being eliminated.

When the electrical equipment on which the sensor 1 is mounted starts to fall, the sensor 1 itself also starts to fall. At this time, the gravity applied to the inertia ball 10 is temporarily reduced apparently. Accordingly, a force of the inertia ball 10 depressing the contact portion 6A is reduced such that the distal end of the contact portion is separated from the inner face of the housing 2, thereby breaking an electric circuit, as shown in FIG. 5, for example. The elasticity of the contact portion 6A is set so that the distal end thereof is separated from the inner face of the housing 2 when the weight of the inertia ball 10 is apparently reduced to half. In this case, when the gravity applied to the sensor 1 is at or below 0.5 G, the electrical equipment can be considered to be in a falling state. Of course, the value of the detected gravity can freely be set by selecting a suitable mass of the inertia ball 10 and a suitable elasticity of the contact portion 6A.

Figure 7:
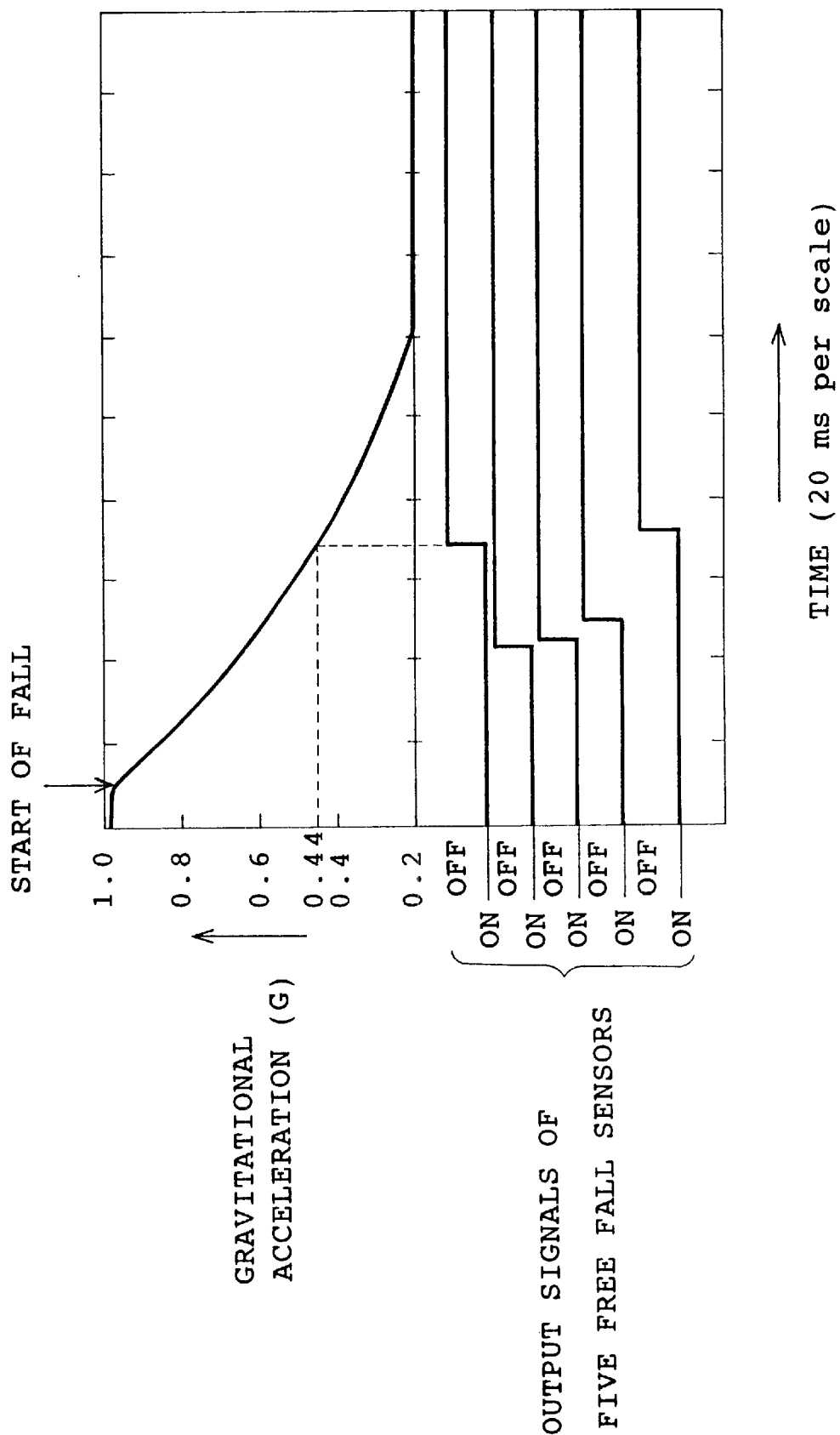
FIG. 7 shows changes in the gravitational acceleration and changes in signals of the sensors.

FIG. 7 shows the results of measurement regarding detecting characteristics of a product of free fall sensor in accordance with the embodiment. In this case, the characteristics of five free fall sensors 1 were measured. In FIG. 7, an abscissa designates the time (ms) and an ordinate designates a gravitational acceleration (G). FIG. 7 shows that the five sensors change respective output signals from ON to OFF in a range of about 0.6 G to 0.4 G.

Figure 14:
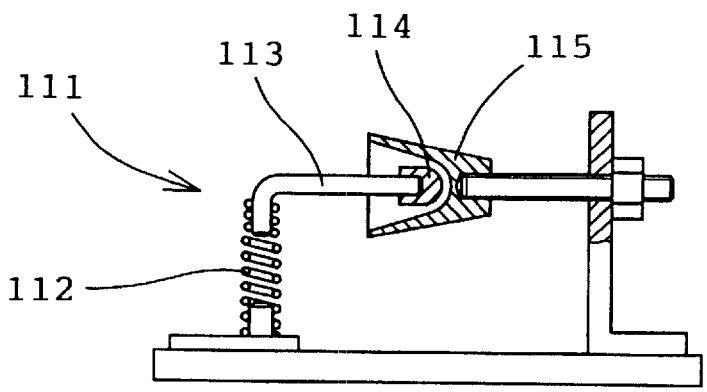
FIG. 14 is a longitudinal section of another prior-art acceleration responsive switch.

Further, assume now that the sensor 1 is mounted on a hard disk drive of a notebook personal computer, for example. When the user touches keys of a keyboard of the computer, the depression causes small oscillation in the computer body. However, the oscillation does not vary the output signals of the sensors 1. The inventors experimentally confirmed that the oscillation due to the aforesaid key-touching operation (normal touching) did not vary the output signal of the free fall sensor 1 of the embodiment. However, the inventors experimentally confirmed that oscillation due to a key-touching operation varied an output signal of the sensor when the prior-art sensor as shown in FIG. 14 was mounted on a hard disk drive of a notebook personal computer, that is, the key-touching operation caused chattering of output signal. Accordingly, an electric circuit for judging and eliminating chattering is required when the prior-art sensor is used. However, no such circuit is required when the free fall sensor 1 of the embodiment is used.

According to the foregoing embodiment, the central axis of the free fall sensor 1 makes a right angle with a direction of gravity, and a plurality of moving portions (contact portions) 6A of the movable electrode 6 are disposed on the circumference of the electrode at regular intervals. Accordingly, the housing 2 needs to be only axially adjusted when the sensor 1 is mounted on electrical equipment. As a result, fundamental characteristics of the sensor 1 do not change even when the housing 2 is turned by any angle about the axis in mounting the sensor 1. Consequently, the same protecting characteristics are obtained both when the hard disk drive is erecting and when it is inverted. Further, when the sensor 1 is mounted on a desktop personal computer and turned about the central axis thereof to be fixed, it may be mounted sideways relative to the desktop personal computer.

The protrusions 9A serving as the buffers are formed on the insulator 9 side in the foregoing embodiment. However, the same effect can be achieved from the construction in which the protrusions are formed on the guide 8 side. Additionally, the protrusions may be discrete from the insulator and the guide, instead.

The housing 2 may be filled with a suitable amount of a damping liquid such as silicon oil having an adjusted viscosity. As a result, the movement of the inertial member (inertia ball 10) can be limited particularly when the sensor is subjected to oscillation which is caused other than by falling and which has a short period. Thus, an unnecessary operation of the protecting mechanism can be prevented.

FIGS. 8 to 11 illustrates a second embodiment of the invention. A free fall sensor 51 of the embodiment comprises a header 55 made of a metal plate 52 and including a conductive terminal pin 53 inserted through a through hole 52A formed in the metal plate 52. The terminal pin 53 is airtightly fixed by the insulating filler 54 such as glass in the hole 52A. The sensor 51 further comprises a bottomed cylindrical metal housing 56 having a closed end and an open end. The header 55 and the housing 56 constitute a hermetic housing. A cylindrical portion of the housing 56 has an outer diameter of 3.3 mm and a thickness of 0.15 mm. Accordingly, a predetermined pressure needs to be applied to the housing 56 during the welding when a conventionally used electric resistance welding such as a ring projection welding is used. In this case, there is a possibility that the housing 56 may be deformed. A welding flange is supposed to be provided on the housing 56. However, since the flange which is larger than an outer diameter of the housing 56 prevents miniaturization of the sensor. In order that the metal plate 52 and the metal housing 56 may hermetically be fixed together by a method which does not require application of pressure, the laser welding is employed in the embodiment. Furthermore, the interior of the hermetic housing is filled with a pollution preventing gas such as gaseous nitrogen or gaseous helium so that the inner face of the metal housing 56 and the surface of an electrode can be prevented from oxidation, whereupon a stable conductive state can be obtained for a long period.

A guide 57 made of an electrically insulating material is provided on an inner side of the header 55 located in the interior of the hermetic housing 56. The guide 57 has a generally central through hole 57A through which the terminal pin 53 is inserted. The guide 57 further has a generally circular depression 57B formed to surround the hole 57A. The depression 57B has a plurality of protrusion-like guiding portions 57C formed on a circumference thereof. The guiding portions 57C guide a fixing plate 59 to its normal position as will be described later. In the embodiment, the depression 57B further has protrusions 57D formed on an outer circumference of the guiding portions 57C and on the side of the guide 57 at the header side respectively. In this case, upon assembly of the guide 57, the protrusions 57D are pressed against the metal housing 56 and the header 55 while being slightly crashed, whereby dimensional errors of components and tolerance due to assembly are absorbed or dissolved such that the playing of components can be prevented.

Figure 10:
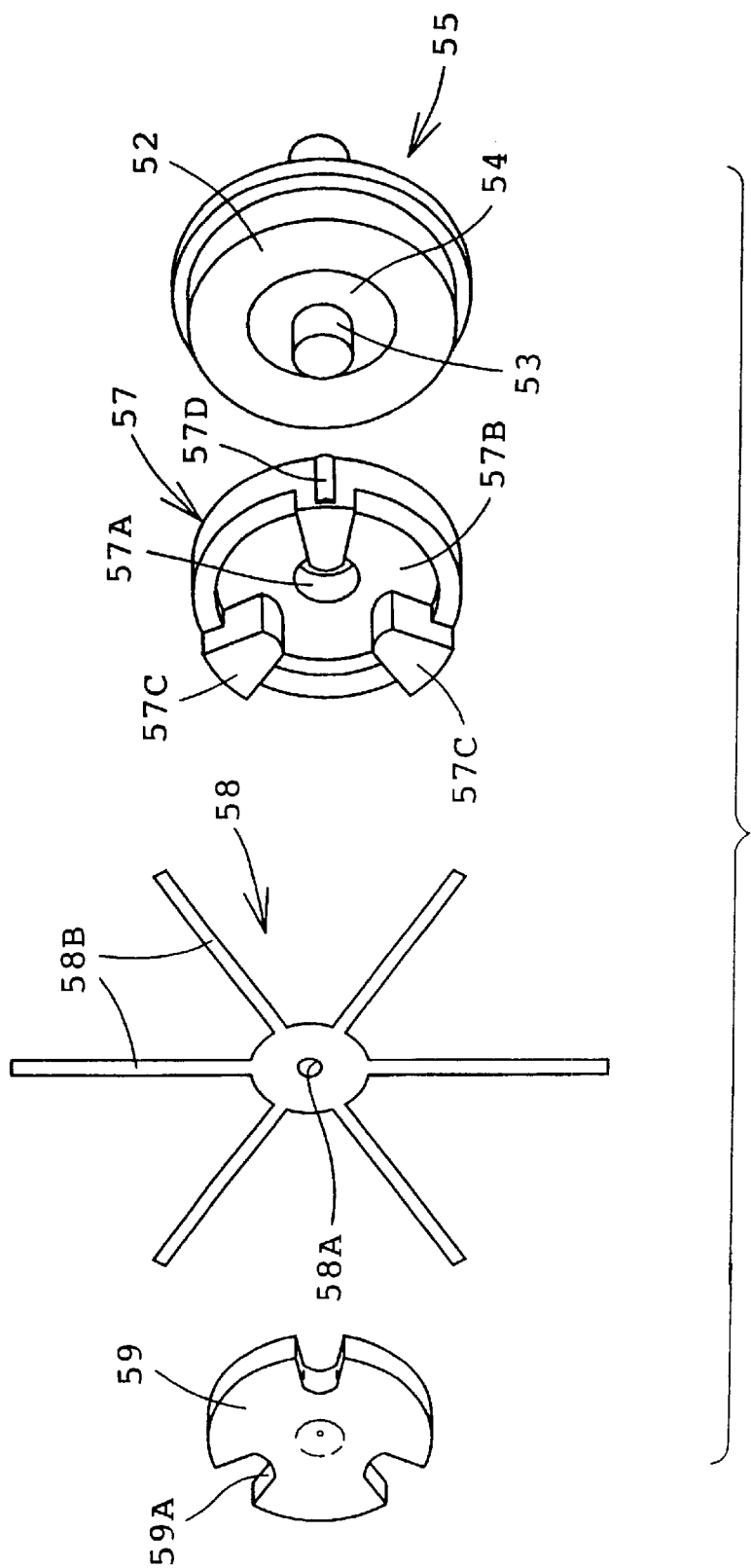
FIG. 10 is an exploded perspective view of a header, guide, movable electrode and fixing plate.
Figure 11:
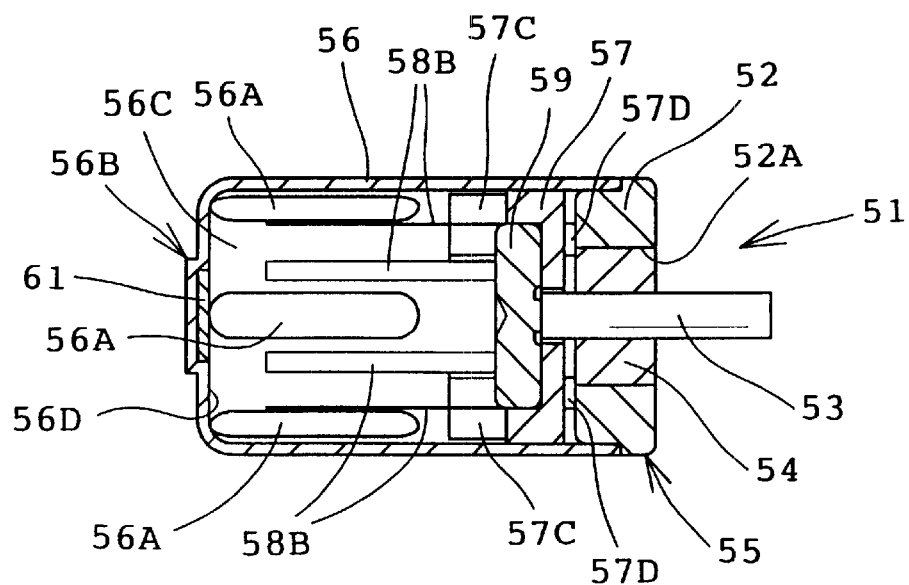
FIG. 11 is a view similar to FIG. 6.

The movable electrode 58 is made of a thin electrically conductive material having a sufficient elasticity, for example, a phosphor bronze plate having a thickness of 10 μm in the embodiment. The movable electrode 58 has a centrally formed through hole 58A and a plurality of contact or moving portions 58B formed around the hole 58A at regular intervals. Before assembly, the movable electrode 58 has the contact portions 58B radially extending from the central portion thereof as shown in FIG. 10. Each contact portion 58B has a sufficient elasticity. The metal fixing plate 59 has a shape conforming to the depression 57B. The fixing plate 59 has three notches 59A formed in the circumference thereof. The guiding portions 57C of the guide 57 are fitted into the notches 59A respectively. The movable electrode 58 is fitted into the depression 57B so that the contact portions 58B are not caught by the guiding portions 57C and thereafter, the fixing plate 59 is fitted into the depression 57B. Each contact portion 58B is held between the inner face of the outer circumferential wall of the depression 57B and the circumference of the fixing plate 59 thereby to be shaped into a predetermined form and held. In this state, the contact portions 58B are equidistant from the central axis of the sensor. Subsequently, the fixing plate 59 is welded to the end face of the terminal pin 53 via the hole 58A of the movable electrode 58. As a result, the guide 57 and the fixing plate 59 are fixed together, and the movable electrode 58 held therebetween is also connected to the terminal pin 53 mechanically and electrically and fixed.

Figure 8:
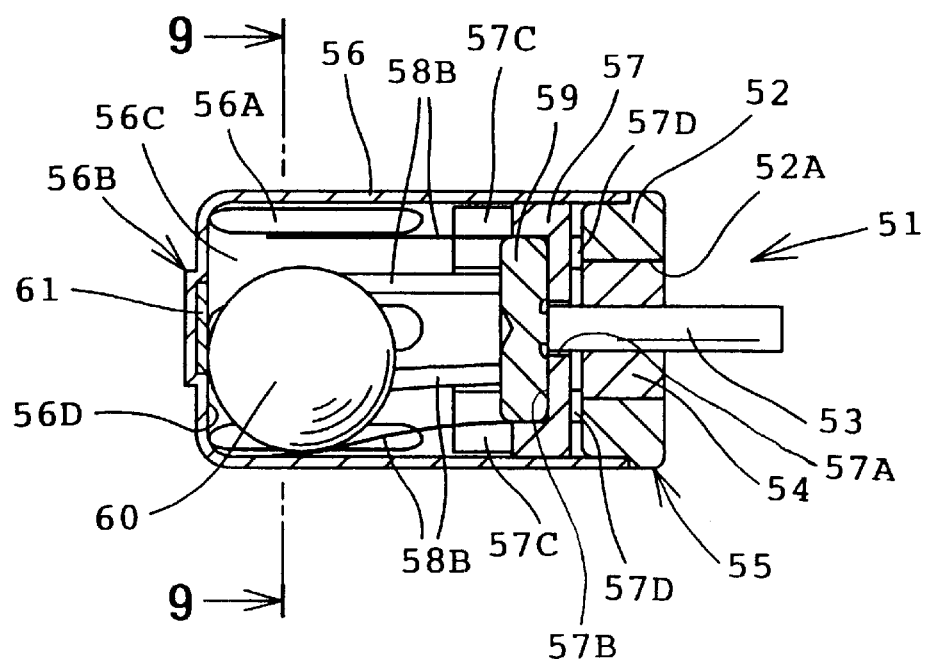
FIG. 8 is a longitudinal section of the free fall sensor of a second embodiment in accordance with the present invention.
Figure 9:
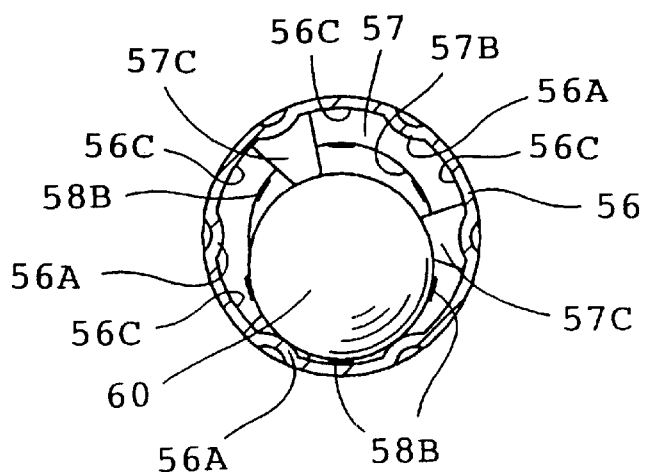
FIG. 9 is a sectional view taken along line 9—9 in FIG. 8.

The inertia ball 60 as the inertial member is provided in the hermetic housing 56. The inertia ball 60 comprises a steel ball. In a case where the sensor 51 is mounted on the electronic equipment in an attitude as shown in FIG. 8, the contact portion 58B of the movable electrode 58 is elastically deformed when the sensor 51 is stationary, so that the distal end of the contact portion 58B is brought into contact with the inner face 56C of the metal housing 56. The inner circumferential wall of the metal housing 56 has a plurality of elongate buffers 56A protruding inward and dividing the inner circumferential face into equal portions. The buffers 56A are formed by means of pressing in the embodiment. The number of the buffers 56A is equal to that of the contact portions 58B and the buffers are formed at regular intervals. When the header 55 is secured to the housing 56, each contact portion 58B is disposed between the buffers 56A adjacent to each other.

An amount of protrusion of each buffer 56A and an interval between the buffers are set so that even when the inertia ball 60 gets near the inner circumferential face 56C, a predetermined distance which is sufficiently larger than the thickness of the contact portion 58B is maintained between the surface of the inertia ball 60 and the inner circumferential face 56C. The amount of protrusion of each buffer 56A and the interval between the buffers are further set so that the surface of the inertia ball 60 does not directly abut the inner circumferential face 56C of the housing 56. The movable electrode 58 is thrust into the recess while a portion of each contact portion 58B near a root thereof is held between the guide 57 and the fixing plate 59, whereby the movable electrode 58 is shaped into a predetermined form. When the sensor 51 has the above-described structure, an extension and permanent deformation or set of the contact portions 58B due to collision of the inertia ball 60 can be prevented even if the sensor 51 is subjected to an impact acceleration in the falling or repetitive oscillation during transportation, and a resultant variation in the characteristic of the sensor 51 can be prevented. The distal end of the elastically deformed contact portion 58B is brought into contact with the inner circumferential face 56C even if the inertia ball 60 does not reach the inner circumferential face 56C. Consequently, the electric circuit between the terminal pin 53 and the metal housing 56 is reliably closed.

The movable electrode 58 is made of a flexible material such as an exceedingly thin phosphor bronze plate. The movable electrode 58 would sometimes be plastically deformed if the inertia ball 60 should collide with a portion at which stress is concentrated, for example, a portion of the movable electrode 58 in the vicinity of which it is secured to the terminal pin 53. In view of this problem, the embodiment provides a structure in which the movable electrode 58 is electrically conductively held between the terminal pin 53 and the fixing plate 59 to be fixed. As a result, since an interface between the movable electrode 58 and the terminal pin 53 is covered with the fixing plate 59, the inertia ball 60 is prevented from a direct contact with the movable electrode 58 even when reaching the interface. Consequently, the movable electrode 58 can be prevented from the plastic deformation.

The location of the distal end of each guiding portion 57C of the guide 57 is set so that the inertia ball 60 is prevented from reaching the end of the terminal pin 53, that is, the interface between the terminal pin 53 and the movable electrode 58. More specifically, the three guiding portions 57C are formed on the circumference of the depression 57B of the guide 57 at regular intervals. The inertia ball 60 abuts the inner distal ends of the guiding portions 57C to be received, whereby the inertia ball 60 is prevented from further movement toward and contact with the terminal pin side. Consequently, the inertia ball 60 is prevented from contact with the metallic fixing plate 59 as well as the interface between the terminal pin 53 and the movable electrode 58.

The closed end or bottom 56D of the metal housing 56 has a depression 56B formed in a portion thereof with which the inertia ball 60 is brought into contact. An insulating member 61 made of a synthetic resin or the like and serving as an electrical insulator is fixed in the depression 56B. The insulating member 61 may be formed by directly applying a synthetic resin material such as adhesive agent to the depression 56B and hardening the material. The directly applied synthetic resin material includes an epoxy resin. In view of the working efficiency, an ultraviolet hardened resin is preferred. Contact of the inertial member with the bottom 56D results in no electrical problem when the surface of the inertial member is covered with an electrically insulating coating or the inertial member itself is made of an electrically insulating material. Accordingly, the insulating member 61 is eliminated in this case.

The operation of the free fall sensor 51 will now be described. The sensor 51 is disposed so that the central axis thereof is horizontal, that is, so that the central axis is perpendicular to the direction of gravity. In the normal stationary state of the sensor 51, the inertia ball 60 is located lowest in the housing 56 and is accordingly located on the buffers 56A. The weight of the inertia ball 60 assuming this position elastically flexes the contact portion 58B of the movable electrode 58 so that the distal end of the contact portion is in contact with the inner circumferential face 56C of the housing 56. Thus, the sensor 51 in which an electric circuit is made via the terminal pin 53 and the metal housing 56 is constituted into a normally closed type switch. In this case, when an electrically conductive member such as the steel ball is used as the inertia ball 60, two electric circuits are provided between the terminal pin 53 and the housing 56, namely, one electric circuit made by direct contact of the contact portion 58B with the housing 56 and the other made by the contact portion 58B, the inertia ball 60 and the buffer 56A or the housing 56. Consequently, the possibility of occurrence of conduction failure can be reduced. Further, the inertia ball 60 is in contact with the buffers 56A formed on the inner circumferential face of the cylindrical portion of the metal housing 56 so as to be spaced from the inner circumferential face 56C. The movable electrode 58 is thrust into the recess while a portion of each moving portion 58A near a root thereof is held between the guide 8 and the fixing plate 59, whereby the movable electrode 58 is shaped into a predetermined form.

When the electronic equipment on which the sensor 51 is mounted starts to fall, the gravity applied to the inertia ball 60 is apparently reduced or rendered zero. The weight of the inertia ball 60 is also apparently reduced. Accordingly, the inertia ball 60 is pushed to be returned toward the center of the housing 56 by the elasticity of the contact portion 58B flexed by the weight of the inertia ball. When thus returned, the inertia ball 60 parts from the buffers 56A, and the distal end of the contact portion 58B also parts from the inner circumferential face 56C. As a result, the sensor 51 is turned off.

In this case, the inertia ball 60 having parted from the inner circumferential face 56C is sometimes brought into contact with the bottom side of the housing 56. In the foregoing embodiment, however, the insulating member 61 is provided on the bottom 56D of the housing 56 so as to cover the portion with which the inertia ball is brought into contact. Consequently, an electric conduction is not achieved even when the inertia ball 60 is brought into contact with the bottom 56D of the housing 56. Further, even if the inertia ball 60 moves toward the terminal pin side, the guiding portions 57C of the electrically insulating guide 57 prevent the inertia ball from movement. In this case, when an amount of protrusion of each guiding portion 57C is small, the inertia ball 60 may come into contact with the fixing plate 59. Since the fixing plate 59 is at the same potential as the movable electrode 58, the electric circuit is not re-closed. Consequently, the free fall sensor 51 can reliably detects the falling condition of the electronic equipment.

When the conductive state of the sensor 51 is monitored by a control device, an optimum protective action or process can be taken so that the damage of the equipment on which the sensor 51 is mounted is rendered minimum when the equipment has fallen. For example, the aforesaid sensor 51 is mounted on the personal computer such as a notebook personal computer or a storage device such as a hard disk drive used in the personal computer. When the personal computer starts to fall, the falling state is detected, and a driving section such as a magnetic disc head can immediately be moved toward the inner radius landing zone, whereupon the damage can be rendered minimum.

The metal balls 10 and 60 serve as the inertial member in the foregoing embodiments. However, when the cylindrical portion of the housing has an inner diameter of about 3 mm, for example, the diameters of the inertia balls 10 and 60 become about 2.4 mm. Thus, when the inertia ball becomes small, the mass thereof is about 57 mg at the largest. The thickness of the movable electrode needs to be reduced to about 10 $\mu$m in order that the movable electrode may be driven by the inertia ball having a small mass. In order that the mass of the inertial member may be increased, the inertial member may have a non-spherical shape such as a column so that a volume thereof is increased.

Figure 12:
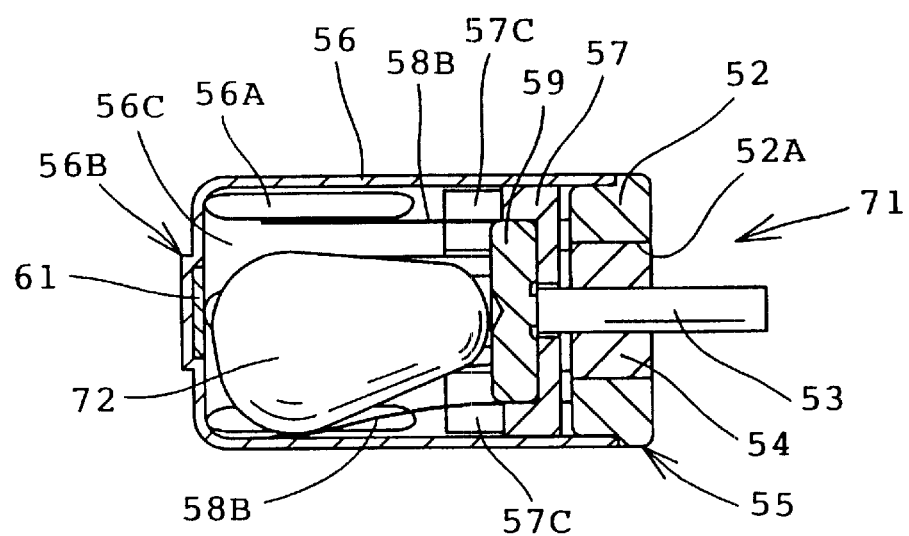
FIG. 12 is a longitudinal section of the free fall sensor of a third embodiment in accordance with the present invention.
Figure 13:
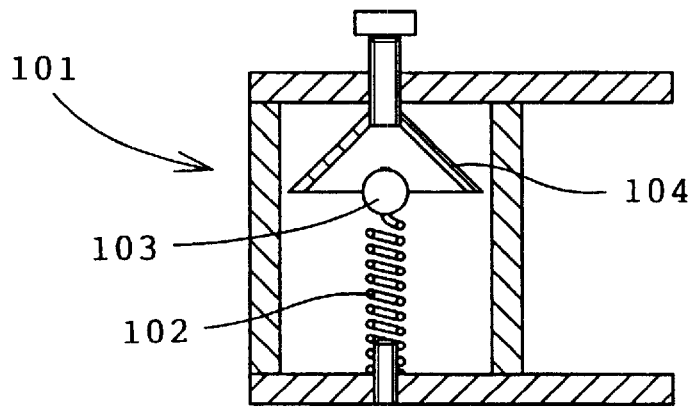
FIG. 13 is a longitudinal section of a prior-art acceleration responsive switch.

The free fall sensor 71 of a third embodiment as shown in FIG. 12 is an example of the above-described one. The identical or similar components in the third embodiment are labeled by the same reference symbols as in the second embodiment, and detailed description of these components are eliminated. An inertial member 72 used in the acceleration switch 71 is a generally pear-shaped rotating member having one of two ends larger than the other. The inertial member 72 is disposed in the housing so that the small-diameter side thereof is loosely fitted in a space defined by the guiding portions 57C of the guide 57 and so that the inertial member 72 is symmetrical about the central axis of the sensor 71. When the inertial member 72 is formed so as to have its maximum diameter same as the inertia ball 60, the volume of the inertial member 72 can be increased by an amount corresponding to a lengthwise elongation of the inertial member 72 as compared with the spherical inertia ball 60, and accordingly, the mass of the inertial member can be increased. The other construction of the free fall sensor is the same as that described in the second embodiment. Consequently, substantially the same effect can be achieved from the third embodiment as from the second embodiment.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A free fall sensor comprising:
   a movable electrode including a plurality of moving portions disposed on a circumference at regular intervals so as to be equidistant from a central axis;
   a fixed electrode disposed outside the movable electrode so as to be brought into contact with and separated from the movable electrode;
   an inertial member located inside the moving portions of the movable electrode; and
   a buffer preventing the inertial member from contacting the fixed electrode so that the moving portions serving as the movable electrode are held between the fixed electrode and the inertial member thereby to be prevented from being pressed or rolled,
   wherein the central axis makes a right angle with a direction of gravity;
   wherein the inertial member normally deforms the movable electrode elastically by a weight thereof so that the moving portions are brought into contact with the fixed electrode, whereupon an electric circuit is made; and
   wherein upon fall, the moving portions return the inertial member by the elasticity thereof and the moving portions are separated from the fixed electrode such that the electric circuit is opened.

2. A free fall sensor comprising:
   a header made of a metal plate and having a centrally formed through hole in which an electrically conductive terminal pin is hermetically fixed by an electrically insulating filler so as to extend therethrough;
   a generally cylindrical bottomed housing made of a metal and having an open end in which the header is hermetically fixed, whereby the header and the housing constitute a hermetic housing;
   an electrically insulating guide disposed in the housing;
   an inertial member disposed in the housing and having a configuration symmetrical about a central axis of the sensor; and
   a movable electrode conductively fixed to a portion of the terminal pin located in the housing and including a plurality of moving portions disposed on a circumstance at regular intervals so as to be equidistant from the central axis,
   wherein the moving portions of the movable electrode have respective distal ends equidistant from an inner surface of the housing substantially serving as a fixed electrode in a free state of the sensor;
   Wherein each moving portion has such elasticity that when disposed horizontally, each moving portion is subject to a weight of the inertial member such that the moving portions are elastically deformed to be brought into contact with the inner surface of the housing serving as the fixed contact, thereby making an electric circuit, the moving portions being separated from the housing against the weight of the inertial member with change in an acceleration during falling, the sensor comprising:
   a buffer provided to be positioned between the moving portions and preventing the inertial member from contacting the fixed electrode so that the moving portions serving as movable electrodes are held between the fixed electrode and the inertial member thereby to be prevented from being pressed or rolled.

3. The free fall sensor according to claim 2, wherein the buffer is electrically insulating and is located on a portion of the inner surface of the metal housing located between the moving portions so that the moving portions serving as the movable contact are prevented from being held between the inertial member and the fixed electrode, leaving substantially no space therebetween, wherein a predetermined space is defined between the inertial member and the fixed electrode.

4. The free fall sensor according to claim 2, wherein the buffer is formed by inwardly protruding a portion of a peripheral wall of the metal housing located between the moving portions so that the moving portions serving as the movable contact are prevented from being held between the inertial member and the fixed electrode, leaving substantially no space therebetween, wherein a predetermined space is defined between the inertial member and the fixed electrode.

5. The free fall sensor according to claim 4, comprising an electrical insulator provided on a bottom of the housing so that the inertial member is prevented from being conductively brought into contact with the bottom of the housing.

6. The free fall sensor according to claim 2, comprising a protrusion provided on the guide so as not to interfere with the moving portions, the protrusion preventing the inertial member from coming into contact with an interface between the movable electrode and the terminal pin and a portion of each moving portion located near a root of the moving portion, the protrusion further preventing the movable electrode from being subjected to a plastic bending deformation.

7. The free fall sensor according to claim 2, comprising:
- a buffer formed by inwardly protruding a portion of a peripheral wall of the metal housing located between the moving portions so that the moving portions serving as the movable contact are prevented from being held between the inertial member and the fixed electrode, leaving substantially no space therebetween;
- an electrical insulator provided on a bottom of the housing so that the inertial member is prevented from being conductively brought into contact with the bottom of the housing; and
- a protrusion provided on the guide so as not to interfere with the moving portions, the protrusion preventing the inertial member from coming into contact with an interface between the movable electrode and the terminal pin and a portion of each moving portion located near a root of the moving portion, the protrusion further preventing the movable electrode from being subjected to a plastic bending deformation.

8. The free fall sensor according to claim 2, wherein the movable electrode has a central through hole formed in a portion thereof to which the terminal pin is fixed, the sensor further comprising a metal fixing plate welded to an end face of the terminal having been inserted through the through hole and conductively holding the movable electrode between it and the terminal pin, wherein at least the fixing plate prevents the inertial member from directly coming into contact with an interface between the movable electrode and the terminal pin.

9. The free fall sensor according to claim 2, comprising a metal fixing plate conductively holding the movable electrode between itself and the terminal pin, and a recess formed in the guide at the terminal pin side so as to conform to a shape of the fixing plate, wherein the movable electrode is disposed between the guide and the fixing plate when the fixing plate is disposed in the recess, and the movable electrode is thrust into the recess while a portion of each moving portion near a root thereof is held between the guide and the fixing plate, whereby the movable electrode is shaped into a predetermined form.

10. The free fall sensor according to claim 9, wherein the fixing plate is non-circular and the recess of the guide has a protrusion conforming to the shape of the fixing plate so that the fixing plate is prevented from rotation.

* * * * *